(12) United States Patent
Dufty

(10) Patent No.: US 7,934,886 B2
(45) Date of Patent: May 3, 2011

(54) ROLLING APPARATUS WITH THREE UNDERCARRIAGES HAVING SMOOTHING ROLLERS

(75) Inventor: Raymond Jeffrey Dufty, Ernest (AU)

(73) Assignee: Tru Turf Pty Ltd, Ernest, Queensland (AU)

(*) Notice: Subject to any disclaimer, the term of this patent is extended or adjusted under 35 U.S.C. 154(b) by 134 days.

(21) Appl. No.: 12/223,766

(22) PCT Filed: Feb. 8, 2007

(86) PCT No.: PCT/AU2007/000133
§ 371 (c)(1),
(2), (4) Date: Dec. 23, 2008

(87) PCT Pub. No.: WO2007/090239
PCT Pub. Date: Aug. 16, 2007

(65) Prior Publication Data
US 2009/0129865 A1 May 21, 2009

(30) Foreign Application Priority Data

Feb. 8, 2006 (AU) .............................. 2006900602
Feb. 10, 2006 (AU) .............................. 2006900660

(51) Int. Cl.
*E01C 19/26* (2006.01)
(52) U.S. Cl. .................... 404/123; 404/125; 404/126
(58) Field of Classification Search .................. 404/122, 404/123, 125–128, 131, 133, 132
See application file for complete search history.

(56) References Cited

U.S. PATENT DOCUMENTS

| 31,087 | A | * | 1/1861 | Pease ............................ 404/122 |
| 167,380 | A | * | 9/1875 | Adams .......................... 404/126 |
| 247,698 | A | * | 9/1881 | Sherwin ........................ 404/126 |
| 265,539 | A | * | 10/1882 | Riddle .......................... 404/125 |
| 273,909 | A | * | 3/1883 | Stevens ......................... 404/125 |
| 353,679 | A | * | 12/1886 | Horey et al. ................... 404/125 |
| 437,606 | A | * | 9/1890 | Kint ............................. 404/125 |
| 591,414 | A | * | 10/1897 | Middleton et al. ............. 404/125 |
| 614,345 | A | * | 11/1898 | Reece ........................... 404/126 |
| 694,213 | A | * | 2/1902 | Stark ............................. 404/125 |
| 998,498 | A | | 7/1911 | Gordon et al. |

(Continued)

FOREIGN PATENT DOCUMENTS

DE 103 55 007 6/2005

(Continued)

*Primary Examiner* — Gary S Hartmann
(74) *Attorney, Agent, or Firm* — Dilworth & Barrese, LLP.

(57) ABSTRACT

Rolling apparatus for rolling of turf or grass surfaces is provided which includes a mobile main frame (11) and at least three undercarriages (61, 62, 63) attached to the main frame (11). Each undercarriage has one or more smoothing rollers (64) in the form of idler rollers; there is further provided a control frame for each of the undercarriages (61, 62, 63) pivotally mounted to each undercarriage with one (63) of the at least three undercarriages located rearwardly or forwardly of the other two (61, 62) undercarriages in a direction of travel of the rolling apparatus. In the direction of travel, each undercarriage is located adjacent to each other presenting substantially no gaps in a front view between adjoining undercarriages or smoothing rollers attached to the undercarriages.

19 Claims, 8 Drawing Sheets

U.S. PATENT DOCUMENTS

| | | | | |
|---|---|---|---|---|
| 1,187,251 | A | * | 6/1916 | Bultman ............ 404/125 |
| 1,981,788 | A | * | 11/1934 | Gardner ............ 405/265 |
| 4,964,753 | A | | 10/1990 | Ciminelli et al. |
| 5,337,833 | A | * | 8/1994 | Rizzo ............ 172/520 |
| 6,119,792 | A | | 9/2000 | Almer |
| 6,457,903 | B1 | | 10/2002 | Dufty |
| 6,460,624 | B1 | | 10/2002 | Dufty |

FOREIGN PATENT DOCUMENTS

| | | |
|---|---|---|
| EP | 67 243 | 12/1982 |
| EP | 229 484 | 7/1987 |
| FR | 2 640 463 | 6/1990 |
| GB | 888868 | 2/1962 |
| GB | 1174622 | 12/1969 |

* cited by examiner

ROLLING APPARATUS WITH THREE UNDERCARRIAGES HAVING SMOOTHING ROLLERS

BACKGROUND OF THE ART

This invention relates to an improvement or modification over rolling apparatus referred to in U.S. Pat. No. 6,457,903 which refers to rolling apparatus, for rolling of turf or grass surfaces including a mobile main frame and one or more undercarriages attached to the main frame wherein the or each undercarriage has one or more smoothing rollers and there is further provided a control arm pivotally attached to the main frame wherein the or each undercarriage is pivotally attached to the control arm such that, in use, the or each smoothing roller closely follows ground contours.

One of the problems associated with the rolling apparatus of U.S. Pat. No. 6,457,903 was the presence of a gap between each of the smoothing rollers which were attached to an adjacent undercarriage. Thus in U.S. Pat. No. 6,457,903 there was disclosed a pair of undercarriages each supporting three smoothing rollers in one embodiment and a second embodiment four undercarriages each supporting three smoothing rollers whereby in each of the embodiments each undercarriage was arranged in a side by side relationship thereby forming a row of undercarriages.

In either of the first or the second embodiments described above the abovementioned gap was located between each adjacent undercarriage thereby spacing each undercarriage and thus each set of smoothing rollers from each other. However in practice it was found that the provision of the gap between each adjacent undercarriage left an unsightly mark on golfing greens and this meant that the putting surface of the greens was not as uniform as would be required especially for greens that were to cater for the world's major golf tournaments.

Reference also may be made to rolling apparatus described in EP 67243, U.S. Pat. No. 998,498, U.S. Pat. No. 6,119,792, U.S. Pat. No. 4,964,753 and FR 2640463 which all relate to rolling apparatus which have a main frame or chassis and a plurality of rollers which do not present any gaps in a front view corresponding to a direction of travel. However none of these conventional rolling apparatus relate to the same type of rolling apparatus described in U.S. Pat. No. 6,457,903 which discloses a control frame pivotally mounted to a main frame which control frame is pivotally mounted to each undercarriage whereby movement of the control frame causes simultaneous movement of each undercarriage.

SUMMARY OF THE INVENTION

It therefore is an object of the invention to provide rolling apparatus that may at least alleviate the abovementioned disadvantage of the prior art.

The invention therefore provides rolling apparatus for the rolling of turf or grass surfaces which includes a mobile main frame and at least three undercarriages attached to the main frame wherein each undercarriage has one or more smoothing rollers and there is further provided a control frame for each of the undercarriages pivotally mounted to the main frame which is pivotally mounted to each undercarriage wherein one of said at least three undercarriages is located rearwardly or forwardly of the other two of said at least three undercarriages having regard to a direction of travel of the rolling apparatus and in a front view of the rolling apparatus having regard to the direction of travel of the rolling apparatus each undercarriage is located adjacent to each other thereby presenting substantially no gaps in said front view between adjoining undercarriages or smoothing rollers attached to said undercarriages.

The other two of said at least three undercarriages are suitably mounted side by side to each other but spaced therefrom and thus may constitute a pair of front or rear undercarriages so as to provide for passage of the third undercarriage during travel or operation of the rolling apparatus whereby passage of the third undercarriage rolls that area of grass or turf which is not impacted by the pair of front or rear undercarriages. The third undercarriage may be trailing or preceding the front or rear undercarriage as may be required. This eliminates or reduces the problems of the prior art discussed above.

The control frame for mounting of said at least three undercarriages is preferably T shaped with the upright of the T providing a longitudinal frame member and the horizontal arm of the T providing a transverse frame member which mounts each of the front or rear undercarriages at each end thereof and wherein the trailing or preceding undercarriage is mounted to said longitudinal frame member at an end remote from the transverse frame member.

However it will be appreciated that the control frame may be a control plate or other suitable shape other than T shaped that facilitates mounting of each of the undercarriages in the orientation described above.

Preferably the control frame is pivotally attached to an undersurface of the main frame or undersurface of a frame member of the main frame. To this end, therefore, a pivot joint may be provided interconnecting the control frame or arm and the main frame which has a pivot pin pivotable about a horizontal axis which is accommodated in bushes or other suitable forms of bearings attached to the control frame and the main frame.

Each undercarriage may be formed in any suitable manner and may, for example, comprise a pair of opposed end frames or end plates interconnecting an intermediate plate or web forming the main body of the undercarriage. Thus, each undercarriage may be channel shaped, such as being U- or V-shaped or alternatively, may comprise an undercarriage plate omitting end frames or end plates, which undercarriage plate is oriented in a substantially horizontal plane in use. Suitably each end frame or plate may have rotatably mounted thereto the one or more smoothing rollers. Preferably there is provided a plurality of smoothing rollers which may be unevenly spaced or evenly spaced. Most preferably there are provided three smoothing rollers.

Each undercarriage is preferably pivotally attached to the control frame so as to be pivotable about a vertical axis. Preferably each undercarriage is pivotable universally about the vertical axis and this may be achieved by a universal pivot joint, such as a ball in socket, for example, or by each undercarriage having a spherical bearing interposed between an upright stud and an outer bearing housing.

Each of the three smoothing rollers may include a longitudinal axle extending the length of each roller which is attached to each end to an associated end frame or plate or alternatively, may be provided with stub axles at each end attached to an associated end frame or plate. Suitably each of the three smoothing rollers are substantially parallel with each other and are also unevenly spaced.

The main frame or chassis may overlie each undercarriage and the control frame. The main frame which is mobile may also support or carry at least one main ground contacting drive roller. There also may be provided drive means which is drivingly connected to the main roller for propelling or driving the rolling apparatus in a line of travel which is suitably normal to the longitudinal axis of at least one of the smoothing rollers.

Preferably a similar drive means may be utilised as described in Australian Patent 522301 which is mounted on the main frame. However, this is not essential and any suitable drive means may be utilised wherein an engine or motor, suitably of the internal combustion type, is mounted on a top surface of the main frame or chassis.

The motor may an output shaft drivingly connected to the drive roller of the main frame via suitable gear means or belt-pulley mechanism.

The main frame is suitably supported by opposed ground engaging wheels located on each side thereof and suitably attached to the main frame by stub axles or other suitable axle means. There also may be provided means for raising or lowering the ground engaging wheels when required for transportation or storage as described in International Publication WO93/19582.

Alternatively, raising or lowering of the wheels may be achieved as described in Australian Patent 522301.

The operating means for causing movement of the control frame may include an operating lever or joystick which is accessible to the driver of the rolling apparatus who may be located in a seat attached to an upper surface of the main frame. Preferably rotational movement of the joystick as a result of the interconnecting transmission causes reciprocatable pivotal movement of each undercarriage. In one form, this may be accomplished by an actuating arm interconnecting the joystick or extension or appendage thereof which moves in a reciprocatable fashion thereby causing its adjacent undercarriage, which is attached to the actuating arm, to also move in similar fashion. Also in this arrangement, each member of a set of three undercarriages may be interconnected by an appropriate linkage mechanism to ensure that once reciprocatable movement of one undercarriage is initiated then corresponding movement of the adjacent undercarriages may also occur.

BRIEF DESCRIPTION OF THE DRAWINGS

Reference may be made to the attached drawings wherein.

DETAILED DESCRIPTION OF THE PREFERRED EMBODIMENT(S)

Figure 1:
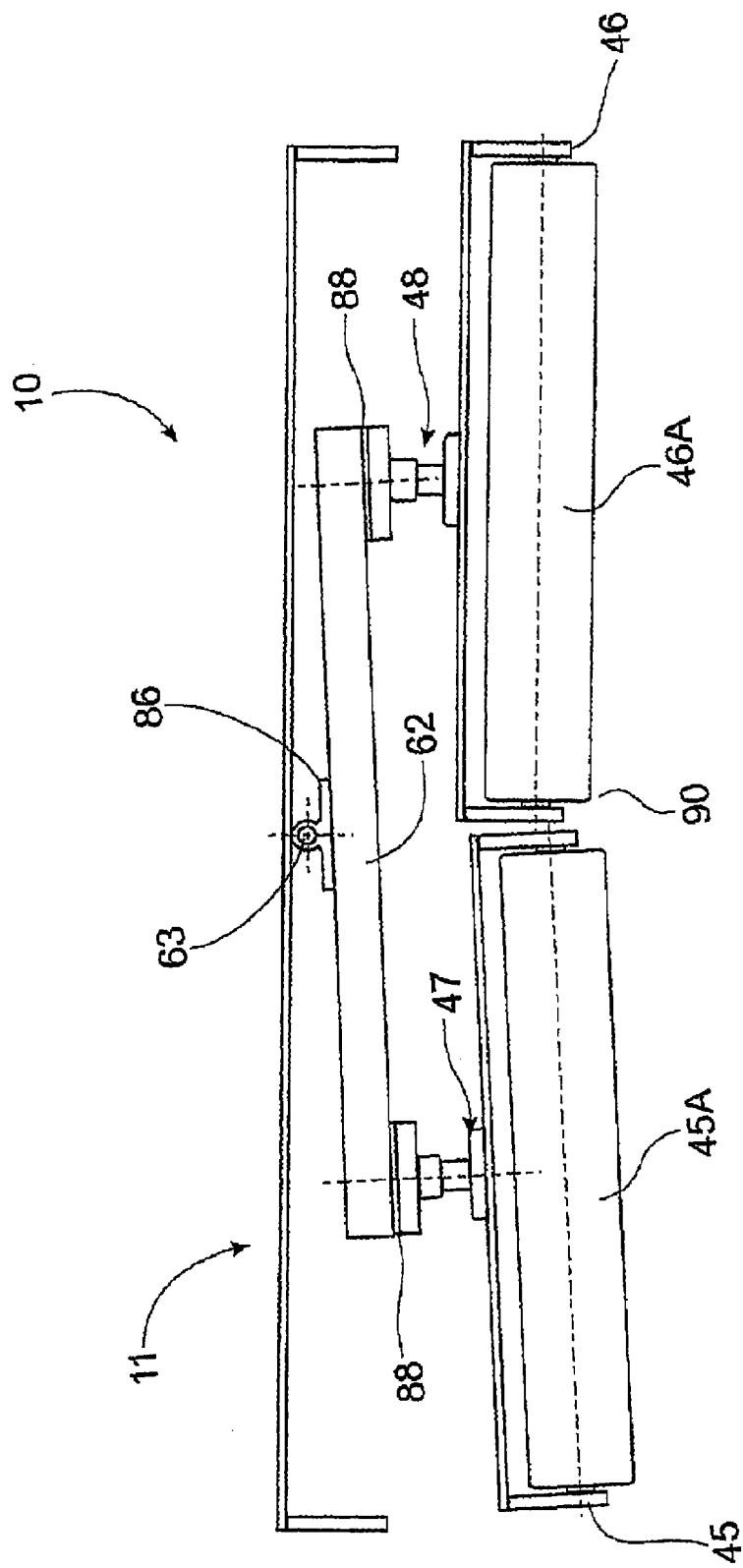
FIGS. 1 and 2 are reproductions of FIGS. 3 and 4 of U.S. Pat. No. 6,457,903 and show pivotal movement of the control arm in one orientation and pivotal movement of the control arm in another orientation.
Figure 2:
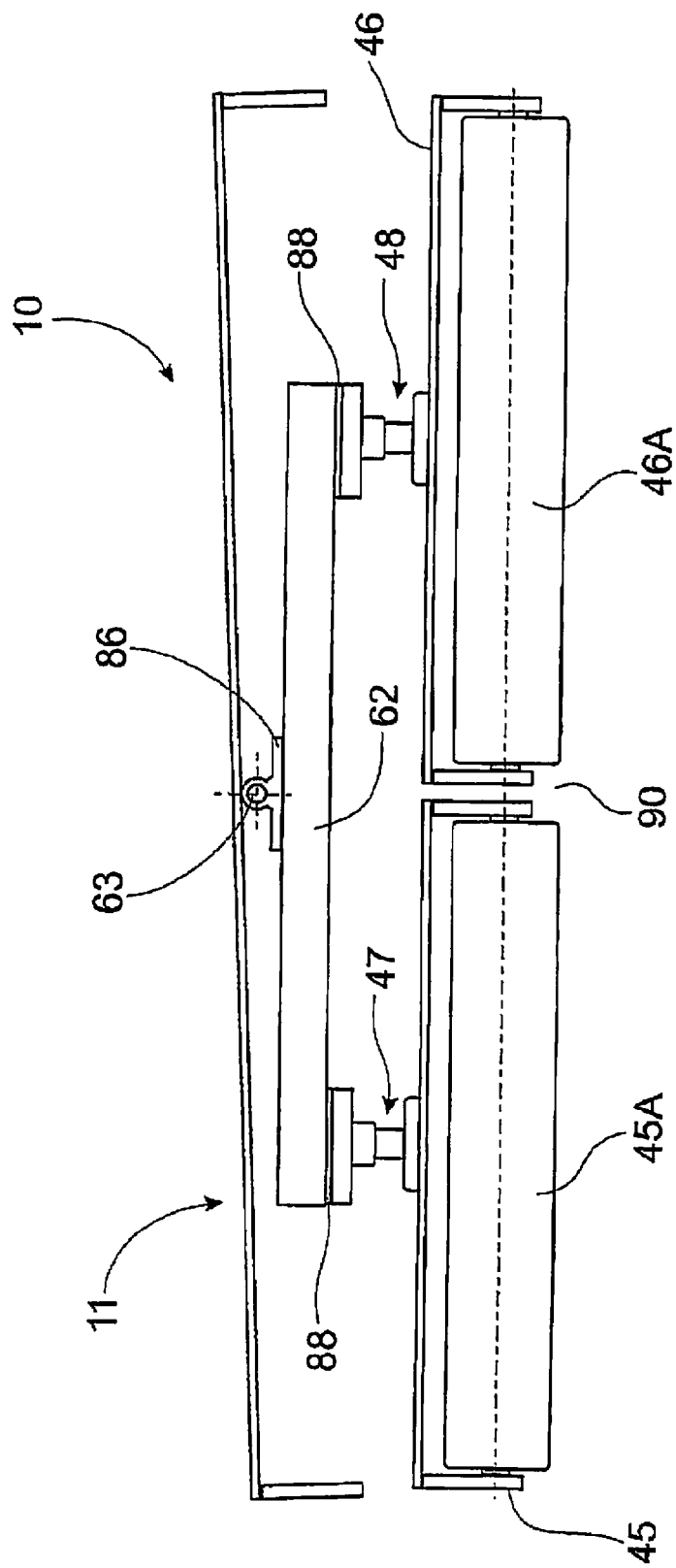

In FIGS. 1 to 2 reference is made to rolling apparatus 10 having main frame or chassis 11, control rod 62 pivotally attached to main frame 11 by pivot joint 63 which includes mounting plate 86 welded to control rod 62 and undercarriages 45 and 46 to each of which are mounted smoothing rollers 45A and 46A. There is also provided pivot assemblies 47 and 48 which interconnect each of undercarriages 45 and 46 to control rod 62 and there is also shown mounting plates 88.

Figure 3:
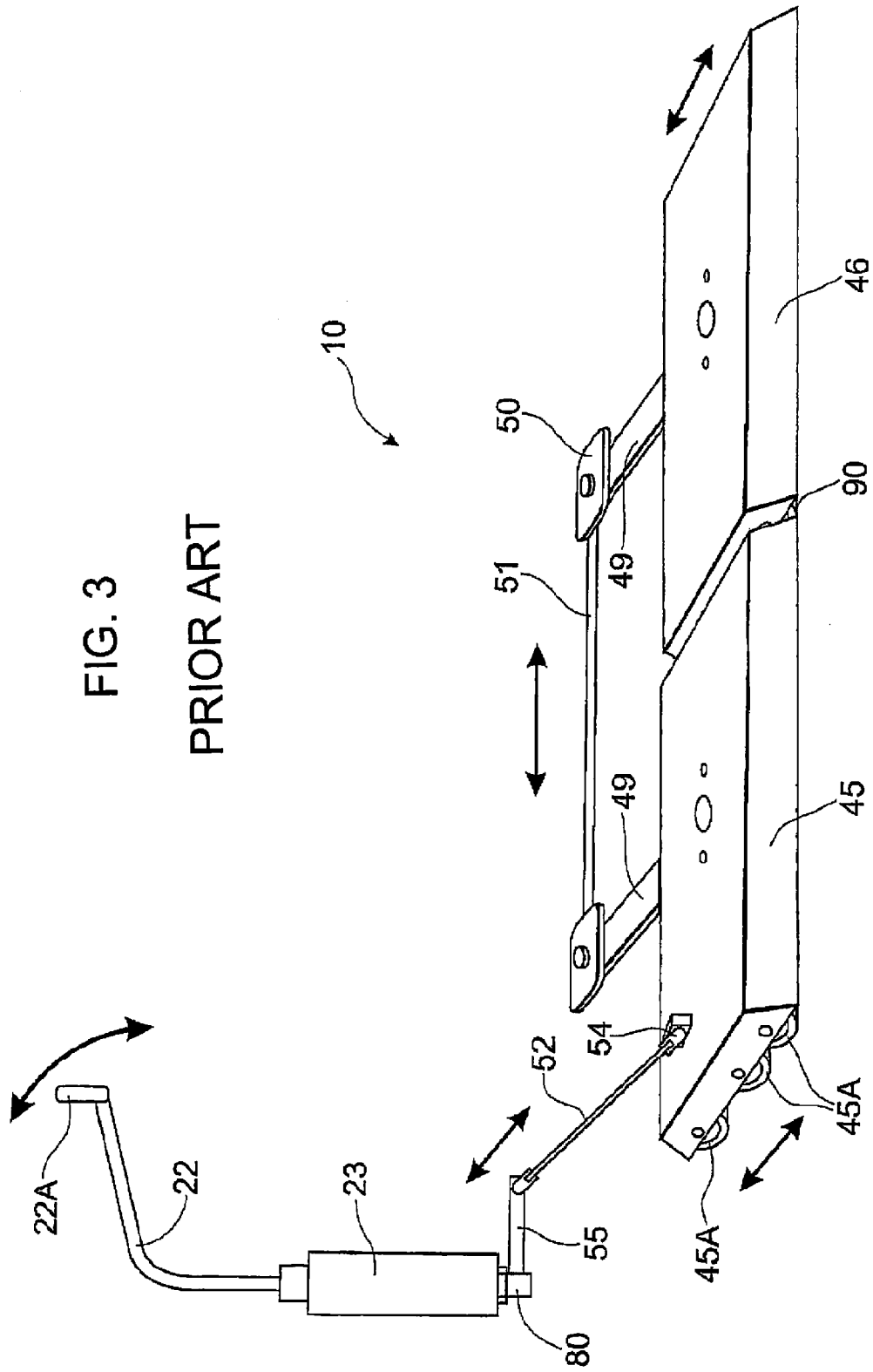
FIG. 3 is a perspective view of an operating mechanism of each of the smoothing rollers shown in U.S. Pat. No. 6,457,903 and is a reproduction of FIG. 8 of this reference.

In FIG. 3 there is shown joystick 22 having handle 22A and support column 23 which functions as a bearing housing for joystick 22 and joystick extension 80 which engages with steering arm 55 to pivot as shown by the doubled headed arrow in bold. Movement of joystick 22 is also indicated by the double headed arrow in bold. Steering arm 55 is connected to linkage rod 52 which is connected to pivot joint 54. Pivot joint 54 is connected to undercarriage 45A. There is also shown connecting arms 49 connected to pivot joints 50 and there is also shown connection rod 51 which interconnects each pivot joint 50.

It is clear from FIGS. 1-3 that reciprocatable movement of the control rod 62 causes reciprocatable movement of undercarriage 45 which translates directly to cause corresponding control movement of control rod 51 which causes corresponding movement of undercarriage 46 as shown.

The mounting of undercarriages 45 and 46 as shown in FIGS. 1-2 to control arm 62 facilitates pivotal movement of each undercarriage 45 and 46 by the operating mechanism shown in FIG. 1.

Figure 4:
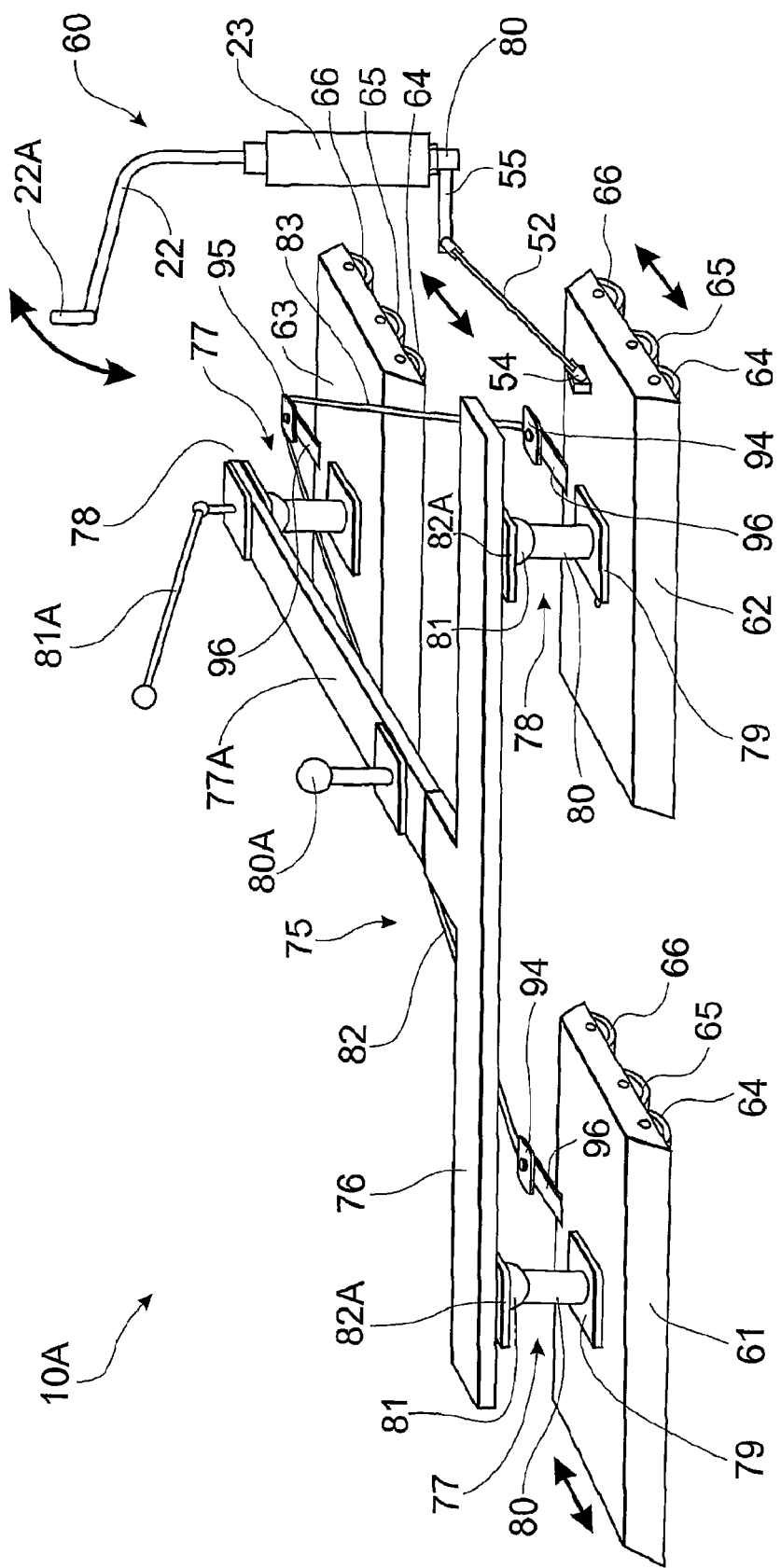
FIG. 4 is a perspective view of a modified operating mechanism in relation to a preferred embodiment of the present invention.
Figure 8:
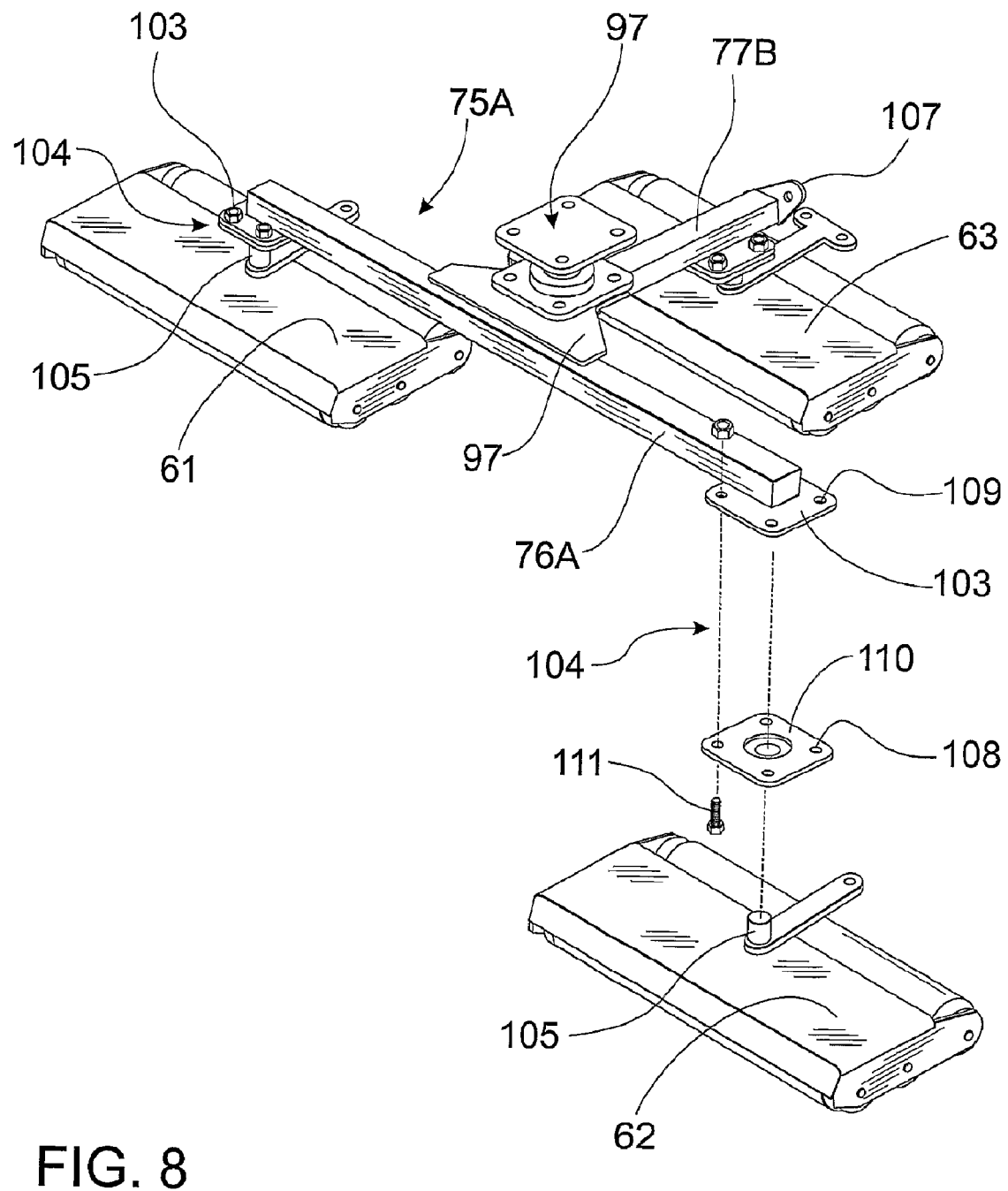
FIG. 8 is an exploded perspective view of a bearing assembly interconnecting one undercarriage with the control frame.

It is also stressed that FIGS. 1 to 3 are reproductions of FIGS. 3, 4 and 8 of U.S. Pat. No. 6,457,903 and if any further information is required concerning operation of the rolling apparatus 10 is required the reader is referred to U.S. Pat. No. 6,457,903 which is totally incorporated herein by reference.

However it will be noted that in FIGS. 1 to 3 there is provided gaps 90 between each of undercarriages 45 and 46 and in some cases the area of golfing green or other greens (e.g. bowling greens) that were being rolled by the rolling apparatus of U.S. Pat. No. 6,457,903 showed an unsightly mark which was missed by each of smoothing rollers 45A supported by undercarriage 45 as well as smoothing rollers 46A supported by undercarriage 46.

Figure 5:
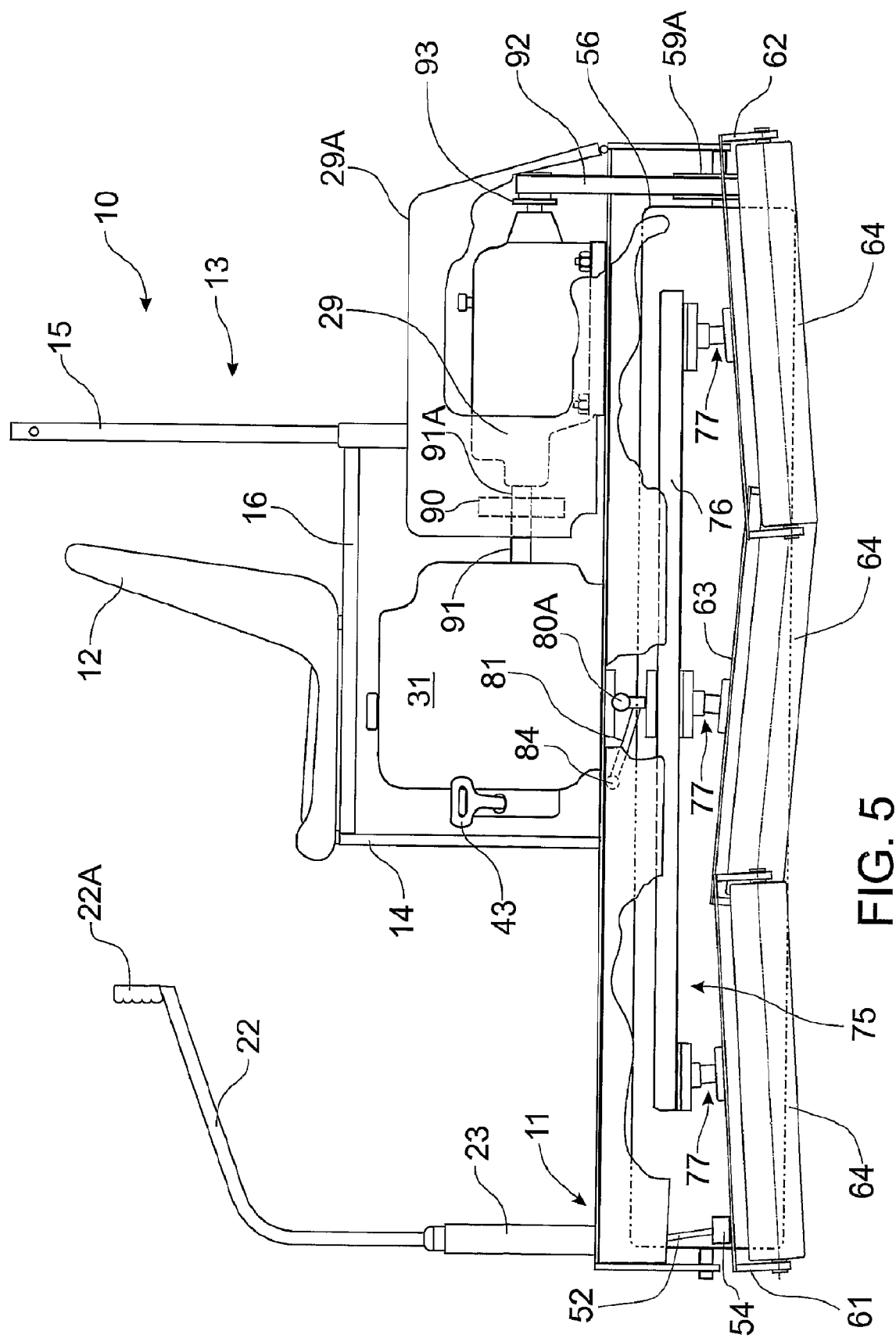
FIG. 5 is a side view of a rolling apparatus which incorporates the rolling mechanism shown in FIG. 2.

In FIGS. 4-5 this problem is overcome by the provision of operating mechanism 60 specifically described in FIG. 4 wherein there is provided undercarriages 61, 62 and 63 each supporting smoothing rollers 64, 65 and 66.

It will be noted that each of undercarriages 61, 62 and 63 are supported by a T shaped frame 75 having a head frame member 76 which is pivotally attached to each of undercarriages 61 and 62 by pivot joints 77 which each comprise a support plate 79, upright 80, ball 81 and mounting plate 82 attached to respective undersurfaces of head frame member 76. The T frame 75 also has a longitudinal frame member 77A and at an end 78 remote from head frame member 76 there is shown undercarriage 63 attached to frame member 77 by pivot joint 77.

The T frame 75 is directly attached to the main frame of the roller body 11 by a spherical rotating coupling 80A and to prevent frame 75 rotating on its axis about coupling 80A there is provided a stabiliser bar 81A which interconnects between the T frame 75 and the main frame 11 at 84. All three undercarriages 61, 62 and 63 are connected by steering rods 82 and 83 so as to enable each of undercarriages 61, 62 and 63 to pivot about their vertical axis simultaneously.

It will be noted that longitudinal frame member 77 is integral with head frame member 76 so that T shaped frame 75 is formed from one piece. However this is not essential. Steering rods 82 and 83 are also pivotally attached to pivot joints 94 of each undercarriage 61 and pivot joint 95 of undercarriage 63.

Each of pivot joints 94 and 95 are attached to support members 96 attached to a respective undercarriage 61, 62 and 63.

In FIG. 5 there is shown rolling apparatus 10A having main frame 11, seat 12 supported on an upright frame 13 comprising spaced uprights 14 and 15 and cross member 16. There is also shown gear box 29 located in gear box housing 29A. Gear box 29 is connected to motor 31 by coupling 90 interconnecting output shaft 91 of motor 31 and input shaft 91A of gear box 29. There is also shown chain 92 interconnecting sprockets 59A and sprocket 93 of gearbox 29 to thereby provide a drive train for main roller 56. There is also provided in FIG. 5 a front view of rolling apparatus 10 showing no gaps between each of undercarriages 61, 62 and 63 which thereby prevents any unsightly gaps between adjacent undercarriages or rollers which was a problem of the prior art rolling apparatus.

It will be readily apparent that operation of the operating mechanism 60 shown in FIGS. 4-5 is similar to that shown in FIG. 3 wherein joystick 22 having handle 22A pivots as shown by the doubled headed arrow in bold whereby steering arm 55 causes linkage arm 52 to pivot as shown in FIG. 2 being connected to pivot joint 54. However connection arms 49, pivot joints 50 and connection rod 51 have now been omitted and replaced by T shaped frame 75 and its ancillary pivot joints 77 and 80 as well as stabiliser bar 81A and linkages 82 and 83.

It will also be appreciated as in the case of U.S. Pat. No. 6,457,903 that the number of undercarriages may be in arrays of three having a front pair of undercarriages and a trailing undercarriage so that there may be two or three of such arrays.

In another variation of the above the T shaped frame may be easily reversed in regard to the orientation shown in the drawings so that undercarriage 63 precedes each of undercarriage 61 or 62 having regard to the direction of travel of rolling apparatus 10. This is shown in phantom in FIG. 5.

Figure 6:
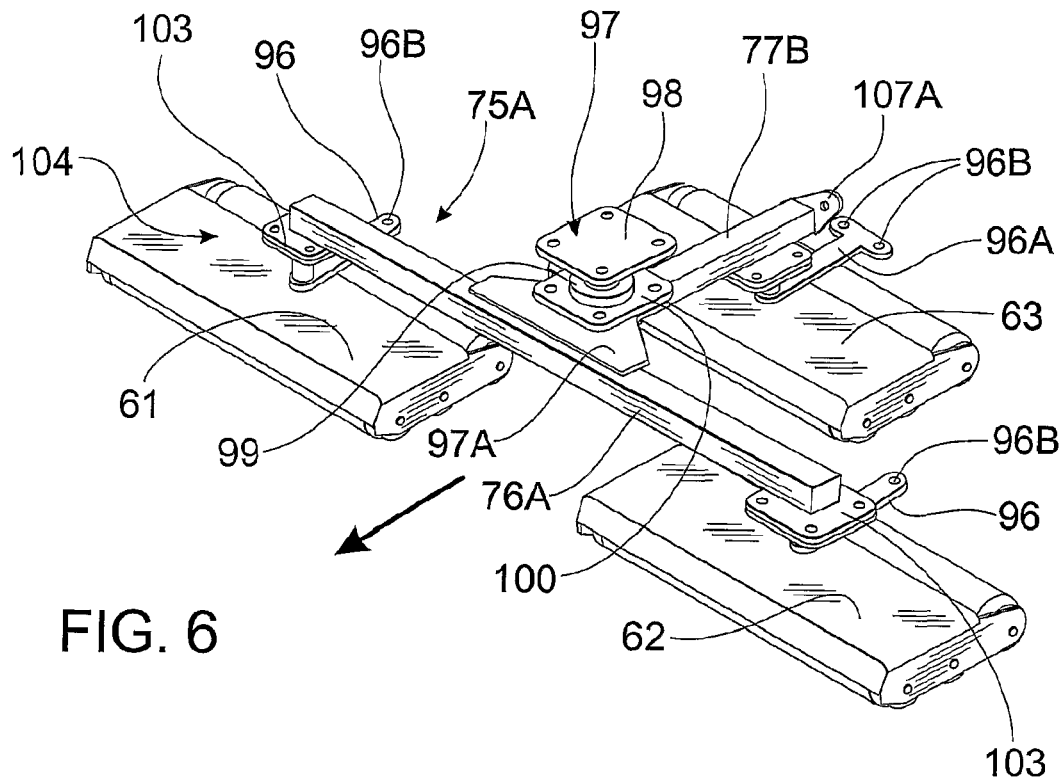
FIGS. 6 and 7 refer to another embodiment of the invention illustrating the reversibility of the orientation of the control frame relative to the main frame.
Figure 7:
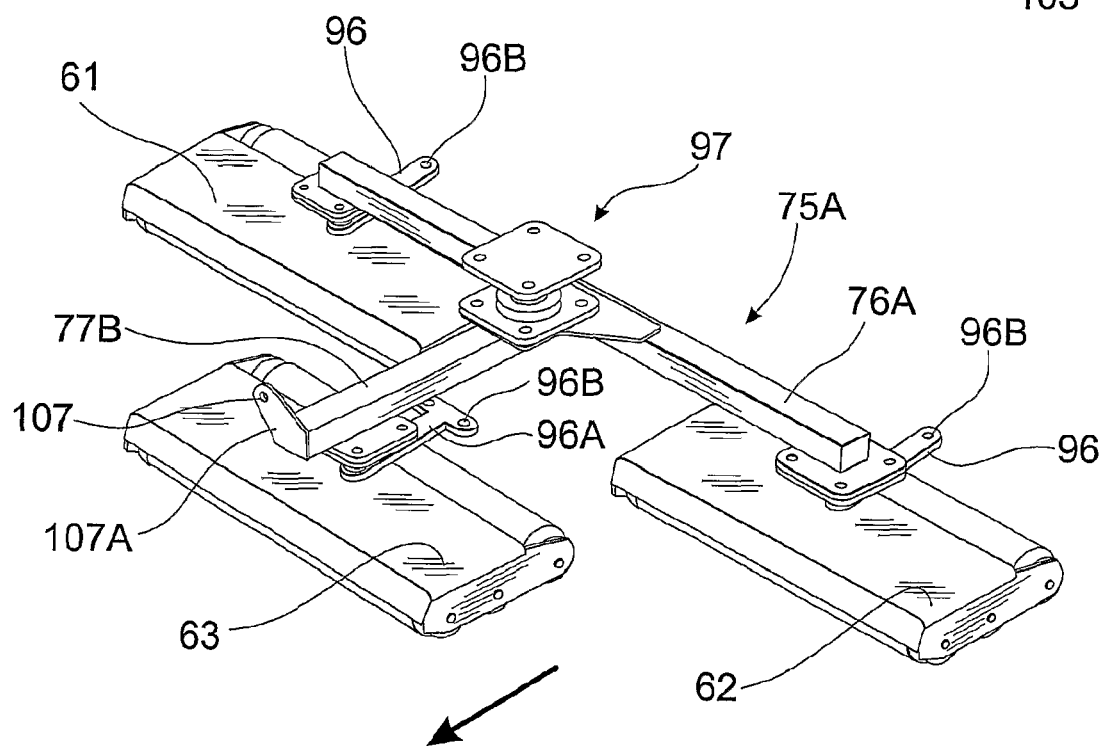

FIGS. 6-7 having regard to a modified T shaped frame 75A for use in the invention. FIG. 6 shows a similar orientation to that shown in FIGS. 4-5 and FIG. 7 shows a reverse orientation.

FIG. 6 shows transverse member 76A and longitudinal member 77B with triangular mounting plate 97A attached to both transverse member 76A and 77B which supports pivot assembly 97 having support plate 98 attached to the main frame (not shown) and bearing 99. There is also shown attachment plates 100 interconnecting bearing 99 to transverse member 76A. There is further provided attachment plate 103 interconnecting bearing 104 and transverse spigot 105 which is attached to support brackets 96 having aperture 107 for attachment to linkage rods 82 and 83 shown in FIGS. 4-5. There is also shown bracket 107 for attachment to stabiliser 81A shown in FIG. 4. Otherwise similar reference numerals are shown which are used in FIGS. 4-5. The arrows in each case show the direction of travel of frame 75A with undercarriage 63 in advance of undercarriages 61 and 62 as shown in FIG. 7 with the reverse being shown in FIG. 6. Rear undercarriage 63 has support member 96A and pivot apertures 96B for provision of linkage rods 82 and 83 shown in FIG. 4 to corresponding support members 96 of undercarriages 61 and 62 each having pivot apertures 96B.

FIG. 8 shows further details of the bearing 104 interconnecting attachment plate 103 and attachment spigot 105 and thus includes a self aligning flange bearing 110 having attachment apertures 108 for attachment to aligned attachment apertures 109 of attachment plate 103 by fasteners 111.

Figure 9:
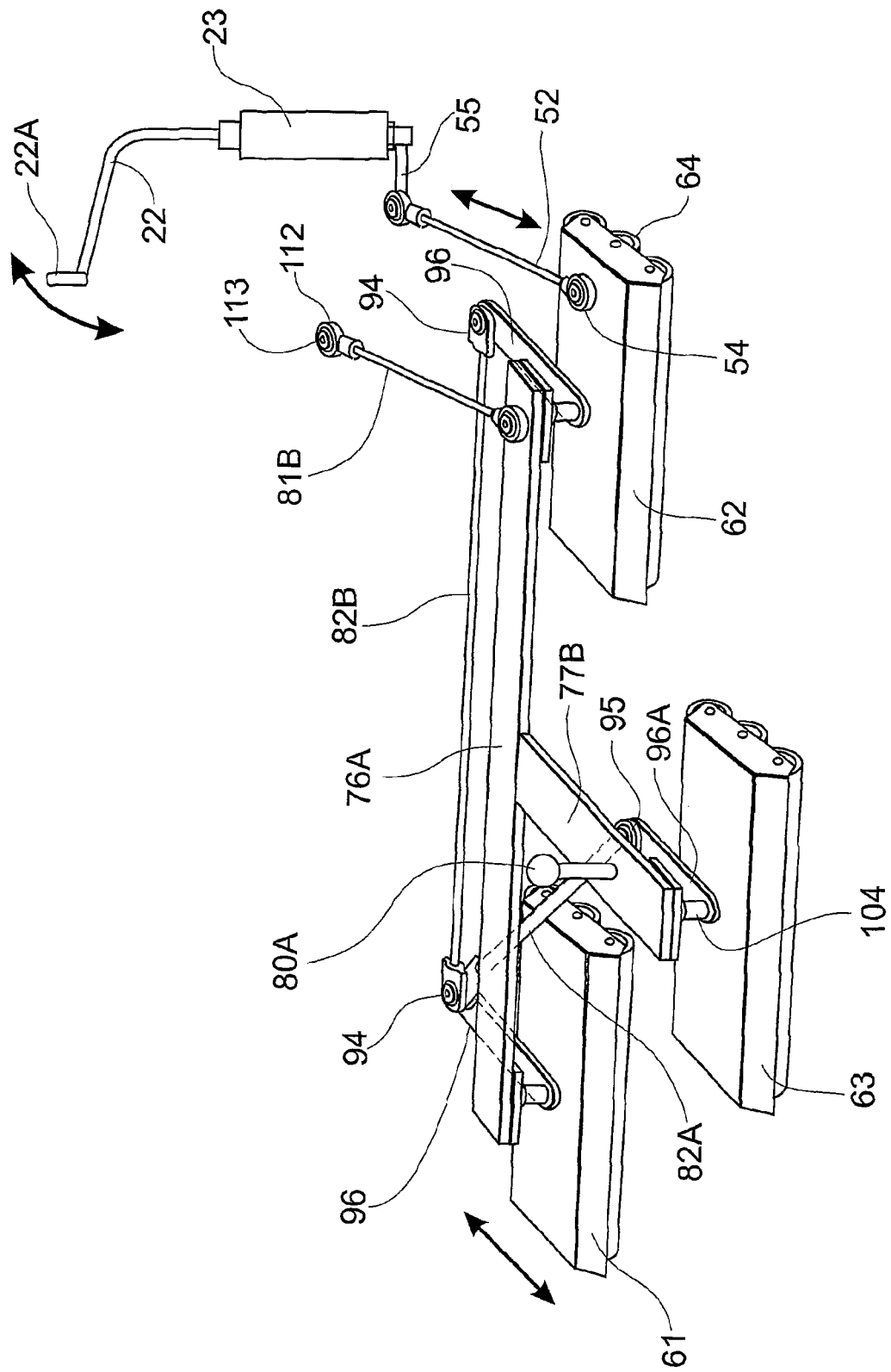
FIG. 9 is a further view illustrating the position of the stabiliser bar and linkage rods between each undercarriage having regard to the embodiment shown in FIG. 7.

In FIG. 9 there is shown more detail of the FIG. 7 arrangement having regard to the location of linkage rods 82A and 83A and stabiliser 81B. Thus linkage rod 82B interconnects rear undercarriages 61 and 62 wherein linkage rod 82B is attached to support members 96 of each undercarriage 61 and 62. In similar manner linkage rod 82A interconnects support members 96 of undercarriages 61 and 63 stabiliser bar 81B has an end 112 and attachment aperture 113 for connection to main frame 11.

The invention claimed is:

1. Rolling apparatus for rolling of turf or grass surfaces which includes a mobile main frame and at least three undercarriages attached to the main frame wherein each undercarriage has one or more smoothing rollers and there is further provided a control frame for each of the undercarriages pivotally mounted to the main frame which is pivotally mounted to each undercarriage wherein said at least three undercarriages include a first undercarriage which is located rearwardly or forwardly of second and third adjacent undercarriages having regard to a direction of travel of the rolling apparatus characterised in a front view of the rolling apparatus having regard to the direction of travel thereof, said three undercarriages presenting substantially no gaps in said front view between adjoining undercarriages or smoothing rollers attached to said undercarriages, wherein the control frame has an upper pivot joint for pivotal attachment to the main frame and at least three lower pivot joints each for pivotal attachment to a respective undercarriage wherein at least two of said lower pivot joints are spaced from each other in a front or rear of the control frame having regard to the direction of travel of the rolling apparatus and the other lower pivot joint is located at a rear or front of the control frame respectively, wherein the control frame is T-shaped with the upper pivot joint located on a longitudinal frame member of the T intermediate each end thereof and said at least two lower pivot joints being located on each end of a traverse frame member defining a cross arm of the T with the other said other lower point joint being located on a free end of the longitudinal frame member, wherein the control frame is attached to the main frame by a stabiliser bar to prevent rotation of the control frame in relation to the main frame, and wherein the rolling apparatus includes first and second horizontal axes which are perpendicular to each other and the control frame can pivot relative to the main frame about said first and second axes.

2. Rolling apparatus as claimed in claim 1 wherein there is provided a pair of front undercarriages mounted side by side and spread therefrom to provide a gap and a rear undercarriage substantially occupying said gap in said front view.

3. Rolling apparatus as claimed in claim 1 wherein there is provided a pair of rear undercarriages mounted side by side and spaced therefrom to provide a gap and a front undercarriage substantially occupying said gap in said front view.

4. Rolling apparatus as claimed in claim 1 wherein there is provided a pair of linkage rods each pivotally interconnecting a respective one of said at least two lower pivot joints with the other said lower pivot joint.

5. Rolling apparatus as claimed in claim 1 wherein said upper pivot is a spherical rotation coupling.

6. Rolling apparatus as claimed in claim 2 wherein the control frame has an upper pivot joint for pivotal attachment to the main frame and at least three lower pivot joints each for pivotal attachment to a respective undercarriage wherein at least two of said lower pivot joints are spaced from each other in a front or rear of the control frame having regard to the direction of travel of the rolling apparatus and the other lower pivot joint is located at a rear or front of the control frame respectively.

7. Rolling apparatus as claimed in claim 3 wherein the control frame has an upper pivot joint for pivotal attachment to the main frame and at least three lower pivot joints each for pivotal attachment to a respective undercarriage wherein at least two of said lower pivot joints are spaced from each other in a front or rear of the control frame having regard to the direction of travel of the rolling apparatus and the other lower pivot joint is located at a rear or front of the control frame respectively.

8. Rolling apparatus as claimed in claim 7 wherein the control frame is T shaped with the upper pivot joint located on a longitudinal frame member of the T intermediate each end thereof and said at least two lower pivot joints being located on each end of a traverse frame member defining a cross arm of the T with the other said other lower point joint being located on a free end of the longitudinal frame member.

9. Rolling apparatus as claimed in claim 6 wherein the control frame is T shaped with the upper pivot joint located on a longitudinal frame member of the T intermediate each end thereof and said at least two lower pivot joints being located on each end of a traverse frame member defining a cross arm of the T with the other said other lower point joint being located on a free end of the longitudinal frame member.

10. Rolling apparatus as claimed in claim 9 wherein the control frame is attached to the main frame by a stabiliser bar to prevent rotation of the control frame in relation to the main frame.

11. Rolling apparatus as claimed in claim 8 wherein the control frame is attached to the main frame by a stabiliser bar to prevent rotation of the control frame in relation to the main frame.

12. Rolling apparatus as claimed in claim 7 wherein the control frame is attached to the main frame by a stabiliser bar to prevent rotation of the control frame in relation to the main frame.

13. Rolling apparatus as claimed in claim 6 wherein the control frame is attached to the main frame by a stabiliser bar to prevent rotation of the control frame in relation to the main frame.

14. Rolling apparatus as claimed in claim 13 wherein there is provided a pair of linkage rods each pivotally interconnecting a respective one of said at least two lower pivot joints with the other said lower pivot joint.

15. Rolling apparatus as claimed in claim 12 wherein there is provided a pair of linkage rods each pivotally interconnecting a respective one of said at least two lower pivot joints with the other said lower pivot joint.

16. Rolling apparatus as claimed in claim 11 wherein there is provided a pair of linkage rods each pivotally interconnecting a respective one of said at least two lower pivot joints with the other said lower pivot joint.

17. Rolling apparatus as claimed in claim 10 wherein there is provided a pair of linkage rods each pivotally interconnecting a respective one of said at least two lower pivot joints with the other said lower pivot joint.

18. The rolling apparatus of claim 1 further including at least two steering mechanisms to permit counter-steering of the first undercarriage relative to the second and third undercarriages.

19. The rolling apparatus of claim 1 wherein each undercarriage is provided with three unequally spaced rollers.

* * * * *